United States Patent [19]

Garrett, Jr. et al.

[11] 4,052,961
[45] Oct. 11, 1977

[54] APPARATUS FOR PLANTING SEED OYSTERS

[76] Inventors: Frederick L. Garrett, Jr.; Frederick L. Garrett, III; Gordon M. Birkett, all of Garrett's Marina, Bowler's Wharf, Va. 22560

[21] Appl. No.: 695,448

[22] Filed: June 14, 1976

[51] Int. Cl.² .............................. A01K 61/00; 119 2–4
[52] U.S. Cl. ........................................ 119/4; 214/15 D
[58] Field of Search ................. 239/672; 214/12, 13, 214/15 D; 114/27; 111/10

[56] References Cited

U.S. PATENT DOCUMENTS

| | | | |
|---|---|---|---|
| 1,430,708 | 10/1922 | West | 214/15 D |
| 2,532,249 | 11/1950 | Ward | 214/15 D |
| 3,542,297 | 11/1970 | Wyrick | 239/672 |
| 3,678,900 | 7/1972 | Kolesa | 119/4 |
| 3,701,338 | 10/1972 | McMillin | 119/4 |

Primary Examiner—Russell R. Kinsey
Assistant Examiner—Peter K. Skiff
Attorney, Agent, or Firm—John H. Merchant

[57] ABSTRACT

An apparatus for uniformly distributing seed oysters over a previously prepared seed bed, comprising a shallow draft vessel having a V-shaped hold, a channel in the lower portion of the hold running substantially the length of the vessel, the sides defining the channel extending through and a short distance beyond the bow of the vessel, an endless belt conveyor mounted in the channel, a centrifugal spinner disk located below the discharge end of the endless conveyor, power means to operate the endless conveyor belt and the centrifugal spinner disk, a series of short plates which rest on the lower portion of the V-shaped hold, which are readily removable to expose progressively portions of the endless conveyor belt as the load of seed oysters is distributed, propulsion means mounted at the stern of the vessel so that the same may be readily maneuvered, the upper surface of the conveyor belt and the centrifugal spinner disk being coated with a soft resilient material to prevent injury to the seed oysters.

6 Claims, 3 Drawing Figures

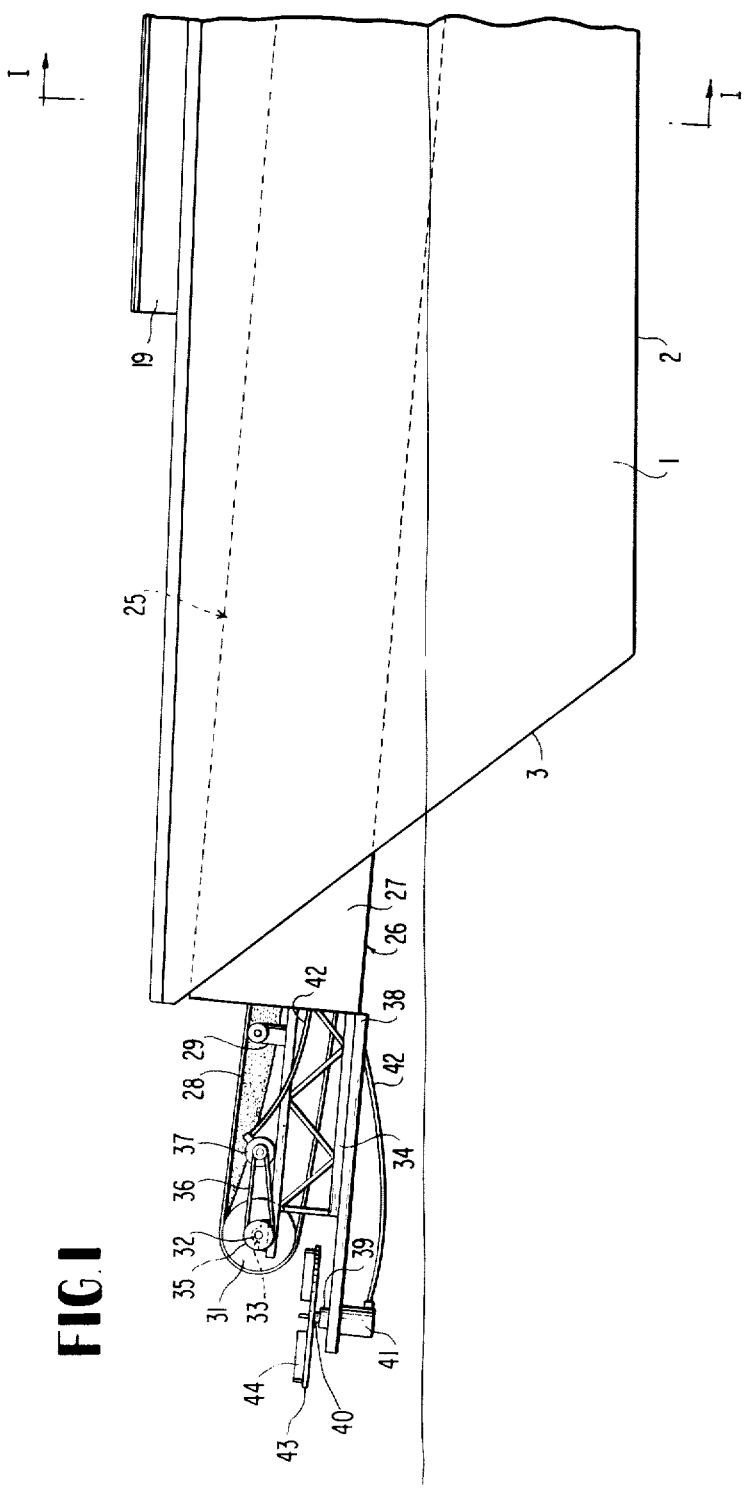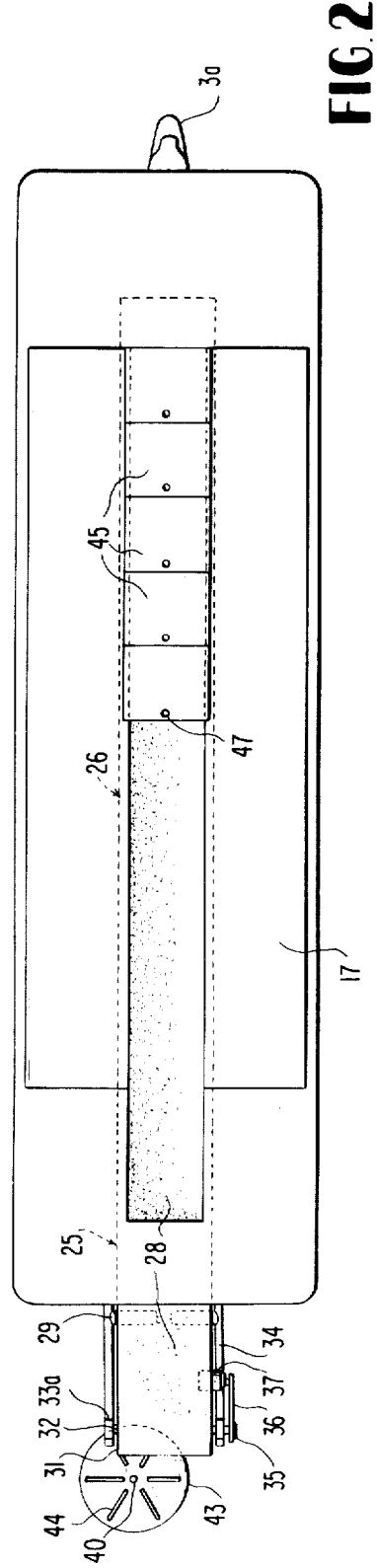

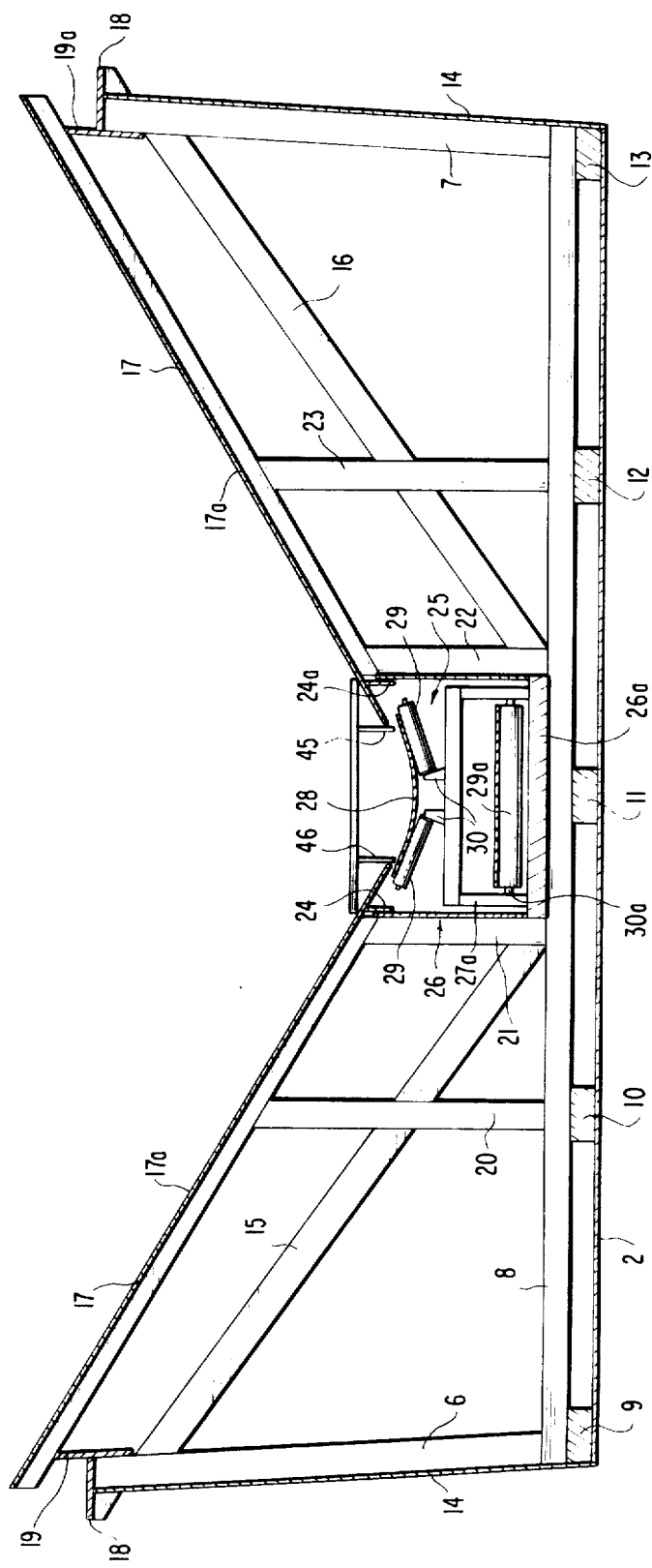

APPARATUS FOR PLANTING SEED OYSTERS

This invention relates to an improved apparatus for the uniform and rapid distribution of seed molusks, and more particularly, to an apparatus for planting seed oysters in which the sowing operation is effected mainly by mechanical means, thereby eliminating much of the manual labor customarily needed to carry out such an opertion.

Seeding oysters in accordance with present practice is a sporadic event which involves securing a crew having the necessary experience in this field at the time or times necessary, and this is becoming more and more difficult as well as expensive. Moreover, manual distribution of the seed oysters lacks the desired uniformity.

Using our improved seed oyster distributing apparatus, the seeding operation can be effected in a reasonably short time with a minimum of manpower. Distribution is much more uniform than that obtained by manual methods, resulting in a larger and therefore a more valuable crop when the oysters are harvested. In practice, it has been found by mechanizing the planting of seed oysters through use of our invention, planting time can be cut from approximately four man hours of manual labor to 15 minutes for 500 bushels. Further, by use of our invention, the seed never remain out of the water for more than 24 hours. In our system seed oysters are transported daily by trucks with dump bodies incorporated in order to transfer seed from truck to hopper without use of manual labor. In previous methods seed oysters were transported by large vessels, sometimes taking from 4 to 6 days time to load and transport to desirable beds, resulting in a low quality seed and very high mortality rate.

Natural oyster beds still exist to a certain extent but scientific methods of oyster farming have resulted in larger yields of higher quality. It takes hundreds of thousands of oysters to make a healthy, natural seed bed and the young oysters, particularly in their formative stage, have a hazardous existence, being subject to many factors such as salinity, depth and temperature of the water, food supply and the condition of the bottom on which they rest. Natural enemies such as drills, also known as boring snails or welks, starfish and crabs, take their toll.

Natural oyster beds have a tendency to disappear due to various factors, such as over-fishing, pollution and water conditions, and oystermen have turned to the cultivation and scientific methods to insure a continuation of the oyster harvest. Experience over the years has resulted in an increased yield as well as improvement in quality.

Scientific "oyster farming" can control to a certain extent the adverse factors referred to above. In some instances, oyster farmers may divide their area into a number of plots, one for seed oysters, another for a different stage of growth, and still another for the harvesting operation when the oysters have reached maturity.

Seed oysters may be cultivated under controlled conditions where the parent oysters are induced to spawn by control of water conditions and other factors. The oyster, within about 20 days, develops a foot appendage with which it can attach itself to a suitable object such as an oyster shell or ceramic tile, known as cultch. After about 6 months the oysters have developed to the stage of "seed oysters" and are ready to be distributed over previously prepared oyster beds.

An object of the present invention is to provide a relatively simple mechanical means for a more economical, rapid, and uniform distribution of seed oysters, thereby eliminating much of the manual labor normally required in accordance with conventional practice.

Another object of our invention is to secure a larger and more uniform harvest of oysters of high quality of greater market value.

Another object of our invention is to provide a mechanized system for the planting of seed oysters wherein the planting time is materially reduced so that the seed oysters never remain out of water for more than twenty-four hours so that the mortality rate is substantially less.

These, and other advantages of our novel oyster seeding apparatus will be apparent from the following description.

FIG. 1 is a side view of the bow of a vessel on which is mounted the herein described oyster seed distributing system, and showing in detail the discharge mechanism for sowing the seed oysters.

FIG. 2 is a plan view showing the conveyor system for feeding the seed oysters to the rotary spinner distributor.

FIG. 3 is a cross sectional view taken along the lines I — I of FIG. 1.

A vessel 1, of the barge type of relatively shallow draft, having a substantially flat bottom 2, a sloping bow 3, and a relatively square stern adapted to support a propulsion means, such as an inboard-outboard motor, shown diagramatically as at 3a, in FIG. 2, provides the basic structure to house and support the herein described seed oyster distributing apparatus. The propulsion unit described, affords maximum maneuverability and variance of speed to effect uniform distribution of the seed oysters.

The outer hull and shape of the vessel is of conventional construction. As shown in FIG. 3, a typical cross-section of the hull structure, side frame members 6, and 7, are attached to a transverse member 8, which rests on and is attached to longitudinal timbers 9, 10, 11, 12, and 13, the latter timbers and side members forming a framwork to support the bottom 2, and the hull planking 14, of the vessel. Additional struts 15, and 16, serve to strengthen and impart the necessary rigidity to the hull structure and serve as a stable platform for the apparatus hereinafter described.

Mounted within the hull of the vessel is a V-shaped hopper 17, the upper edge of which extend above the deck 18, of the vessel, the height of the hopper being determined by the capacity desired. Support for the bottom of the hopper 17, is provided by vertical members 19, 19a, 20, 21, 22, and 23. The slope of the bottom of the hopper may be varied within reasonable limits but in practice, a slope of about $22\frac{1}{2}°$ has been found to be satisfactory. The slope of the bottom of the hopper should be sufficient, however, to permit ready transfer of the seed oysters from the hopper to the endless conveyor system, described below.

The hopper 17, is provided with a lining 17a, the lower edges of which project into a central channel, indicated generally at 25, and over the outer edges of an endless belt conveyor, hereinafter described. Flanges 24 and 24a, attached to the underside of the lining 17A, and run the full length of the central channel.

At the center of the hopper 17, a channel 25, generally rectangular in cross-section, runs through the hull of the vessel from the bow to a point near the stern and extends, as indicated at 27, a short distance beyond the bow 3, the two sides and bottom of the channel providing a housing 26, for an endless belt conveyor 28, mounted in said channel. The bottom of the housing 26a, rests on and is supported by the vertical members 21, and 22. The upper surface of the conveyor belt 28, is supported within the channel 25, by a series of rollers 29, mounted on suitable bearings 30, attached to a framwork 27a, located within the housing 26. The brackets 30, of a U-shaped configuration, have an axle rigidly secured thereto on which the rollers 29, are free to turn. A system of rollers 29a, supported by bearings 30a, may be used to support the lower surface of the endless belt conveyor 28. As previously noted, lining 17a, of the hopper 17, projects into the central channel 25, and extends for a short distance over the outside edges of the conveyor belt 28, as illustrated in FIG. 3.

As shown in FIGS. 1 and 2, the conveyor housing 26, extends beyond the bow of the vessel, the conveyor belt 28, extending through the the open end of the housing 26, and passing over a large roller 31, fastened to shaft 32, said shaft being supported by bearings 33 and 33a, attached to an extension 34 of the conveyor housing 26. Attached to the shaft 32, is a spocket 35, connected by chain 36, to the drive shaft of a hydraulic motor 37, of conventional design, to impart rotation to the large roller 31.

A bracket 38, fastened to the extension 34, has mounted at the outer end thereof, beyond the bow of the vessel, a bearing 39, adapted to receive and support a shaft 40, the lower end of which is attached to the drive shaft of a hydraulic motor 41, pressure to which is supplied by a hydraulic pump, not shown, through conduit 42. Attached to the upper end of the shaft 39, is a centrifugal spinner disk 43, the upper surface of which has rigidly attached thereto a series of L-shaped vanes 44, extending radially of the disk.

Shell fish in general, and seed oysters in particular, are relatively delicate organisms and have to be handled with care to protect the gills at all times during the seeding operations. In order to prevent injury to the seed oysters, the upper surfaces of the conveyor belt and the upper surfaces of the spinner disk and throwing vanes are coated with a relatively soft but durable material, such as rubber or vinyl, or similar resilient material.

In order to control the flow of seed oysters from the hopper 17, to the conveyor belt 28, a series of removable plates 45, preferably from one to two feet long, are removably positioned on the lining 17a, of the hopper 17, being held in place by brackets 46, welded to the underside of the plates. These plates normally cover the belt conveyor but are readily removable by inserting a metal hook or similar instrument through holes 47, provided in each plate for this purpose, to progressively expose sections of the conveyor as the load of seed oysters are distributed over the seed bed.

In operation, the seed oysters are loaded into the hopper 17, the conveyor belt being covered by the series of short plates 45, until the vessel reaches the area to be seeded. One or more of the short plates 45, adjacent to the discharge end of the vessel are removed exposing a portion of the conveyor belt 28, and the belt and spinner disk set in motion. As the vessel moves over the area to be seeded the seed oysters are fed onto the exposed portions of the conveyor belt, the seed oysters carried forward by the conveyor and deposited on the spinner disk where they are distributed by centrifugal force over the oyster bed.

Distribution is rapidly effected in a uniform manner and with a minimum of manual labor. As the load of seed oysters is distributed, more plates are removed exposing additional sections of the conveyor belt, and this procedure is repeated until the sowing operation has been completed.

Having thus described our invention, it should be understood, of course, that the foregoing disclosure relates to a preferred embodiment, and it will be appreciated that various changes may be made in the size and proportions of the various elements of our seed oyster distribution apparatus without departing from the spirit of the invention more clearly defined in the appended claims.

What is claimed is:

1. In an apparatus for uniformily distributing seed oysters over a previously prepared oyster seed bed, comprising:
   a vessel having a bow and stern of conventional design, and a V-shaped hold; adapted to contain seed oysters
   a substantially U-shaped structure having sides and a bottom defining a channel in the lower portion of the hold, running substantially the length of the vessel, the sides and bottom of the U-shaped structure extending through and a short distance beyond the bow;
   an endless conveyor mounted in said channel;
   a centrifugal spinner disk mounted on a bracket projecting from the bow of the vessel, located below the discharge end of the conveyor, the upper surfaces of the conveyor and the spinner disk being coated with a soft reselient material to prevent injury to the seed oysters;
   a series of short plates resting on the lower surfaces of the V-shaped hold, above the conveyor, said plates being readily removable to expose progressively portions of the conveyor as the load of seed oysters is distributed;
   power means for operating the conveyor and the spinner disk, and
   an inboard-outboard motor mounted at the stern of the vessel to enable the same to the readily maneuvered over the oyster bed during the seeding operation.

2. An apparatus as defined in claim 1, in which the vessel is of relatively shallow draft.

3. An apparatus as defined in claim 1, in which the conveyor is an endless belt.

4. An apparatus as defined in claim 1, in which the series of short plates normally covering the conveyor have attached to the under surfaces thereof, brackets to maintain the same in position, each plate having a hole therein in which a metal hook or other instrument may be inserted to facilitate removal of the plate.

5. An apparatus as defined in claim 3, including a framework located in the lower portion of the U-shaped channel, having a series of rollers mounted on bearings attached to said framework, affording support for the endless conveyor belt.

6. An apparatus as defined in claim 3, including a bracket extending beyond the bow of the vessel, having a power driven roller mounted thereon, the outer end of the endless belt conveyor being supported by and actuated by the power driven roller.

* * * * *